United States Patent [19]

Bystry

[11] Patent Number: 5,352,003
[45] Date of Patent: Oct. 4, 1994

[54] CABLE LOCKING AND SEALING DEVICE

[75] Inventor: Jerry A. Bystry, Orland, Ind.

[73] Assignee: Brammall, Inc., Angola, Ind.

[21] Appl. No.: 131,600

[22] Filed: Oct. 5, 1993

[51] Int. Cl.⁵ ............................................. B65D 27/30
[52] U.S. Cl. .................................. 292/323; 292/252; 292/307 R
[58] Field of Search ............ 292/252, 323, 327, 307 R, 292/319; 24/115 L, 136 A, 136 L

[56] References Cited

U.S. PATENT DOCUMENTS

| | | | |
|---|---|---|---|
| 3,994,521 | 11/1976 | Van Gompel | 292/252 X |
| 4,074,916 | 2/1978 | Schindler | 292/307 R |
| 4,681,356 | 7/1987 | Brammall | 292/327 |
| 4,747,631 | 5/1988 | Loynes et al. | 292/307 R |
| 5,092,641 | 3/1992 | Penick, Jr. | 292/307 R |
| 5,222,776 | 6/1993 | Georgopoulos et al. | 292/323 |

*Primary Examiner*—Rodney M. Lindsey
*Attorney, Agent, or Firm*—Hill, Steadman & Simpson

[57] ABSTRACT

A cable locking and sealing device which has an attached cable and the free end of the cable can be passed through a member to lock it. Then the free end of the cable is passed down through an opening in the body of the locking and sealing device in which there is a spring biased conical-shaped member that carries a ball mounted in a transverse opening. The ball rides on an inclined conical surface and engages and locks the cable when an attempt is made to withdraw it from the locking device in a direction opposite to the inserted direction.

1 Claim, 1 Drawing Sheet

CABLE LOCKING AND SEALING DEVICE

BACKGROUND OF THE INVENTION

1. Field of the Invention

This invention relates in general to a cable locking and sealing device and in particular to a cable locking structure which allows the cable to be moved through it in one direction but which locks the cable when it is pulled in the opposite direction.

2. Description of Related Art

Prior cable locking and sealing devices are shown in U.S. Pat. Nos. 4,747,631, 5,092,641, 3,770,307 and 4,074,916.

SUMMARY OF THE INVENTION

This invention relates to a cable locking and sealing device which has a main body member in which one end of a cable is staked so that it is locked to the body member and the free end of the cable can be passed through a device to lock it after which it is inserted into an opening in the body member. The opening has a conical shape in which a truncated cone-shape member is mounted and which is formed with an opening through which the cable passes and has a side opening in which a ball is mounted which engages the side walls of the conical opening and the cable when it is inserted into the locking device. A spring biases the truncated cone-shape member in a direction so that the ball moves on the conical surface in a direction so as to force it into engagement with the cable to lock it. Thus, the device allows the cable to be freely moved in one direction, but prevents it from moving in the opposite direction. Thus, the device comprises a locking means since the cable locks the members through which it has been inserted and also comprises a security seal in that the cable would have to be cut to remove the device from the locked item.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure, and in which:

DETAILED DESCRIPTION OF THE PREFERRED EMBODIMENTS

Figure 1:
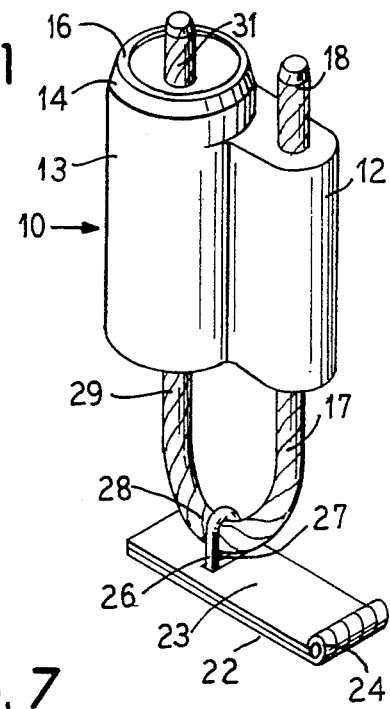
FIG. 1 is a perspective view of the cable locking and sealing device.
Figure 2:
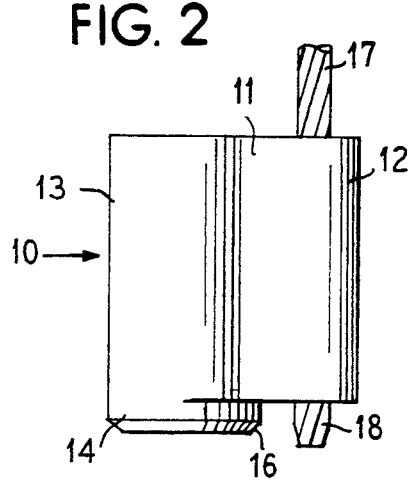
FIG. 2 is a side plan view of the locking device.
Figure 6:
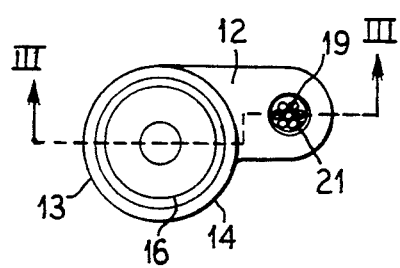
FIG. 6 is a top plan view.
Figure 7:
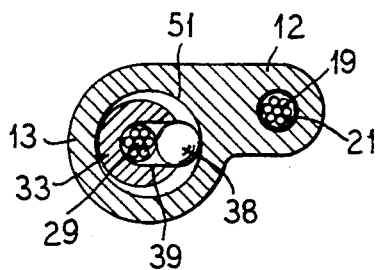
FIG. 7 is a sectional view taken on line VII—VII from FIG. 5.

FIG. 1 illustrates the locking device 10 which has a body member 13 with an extension 12. A projection 14 extends from the body member 13. A cable 17 has a first end 18 which extends from the body portion 13 and passes through an opening 21 formed in the extension 12 of the body member 13. A portion 19 of the cable 17 within the body portion 12 is staked to the body portion so that it is locked to the body portion. Portion 17 of the cable which extends from the body portion 13 can be passed through a loop 26 so as to lock a planar member 22 to which the loop 26 is attached to planar member 23 which is pivotally connected by hinge 24 to the member 22. An opening 27 allows the loop 26 to pass through the member 23 as shown in FIG. 1. A portion 28 of the cable passes through the loop 26 and the end 29 is inserted into an opening 32 of the body member and end 31 of the cable extends from the body member.

As best shown in FIGS. 3, 4, 5 and 7, adjacent the opening 32 is a conical-shaped opening 34 in which a truncated cone-shaped member 33 is received. The cone-shape member 33 has an opening 37 at one end which aligns with the opening 32 and the opening 37 extends through the truncated conical-shaped member 33 so as to receive the cable end 31 therethrough. A transverse opening 39 is formed in the truncated conical-shaped member 33 and a ball 38 is mounted therein as shown in FIGS. 3, 4, 5 and 7.

A spring 42 has an end 43 which bears against the end 41 of the truncated conical member 33 and its other end 44 engages a washer 46 which has a central opening 48. A tapered surface 47 of the washer 46 leads to the opening 48 and the washer 46 is mounted between a shoulder 49 formed in the body member 13 and a turned in portion 16 so as to lock it to the body member.

Figure 4:
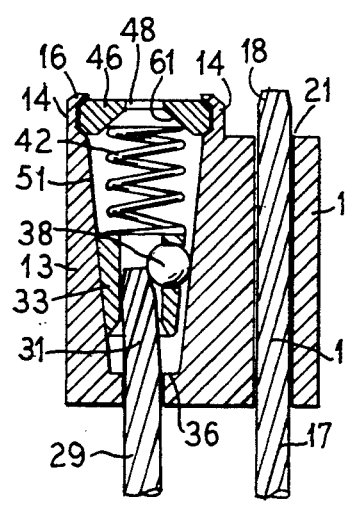
FIG. 4 is a sectional view illustrating the end of the cable partially inserted into the locking means.
Figure 5:
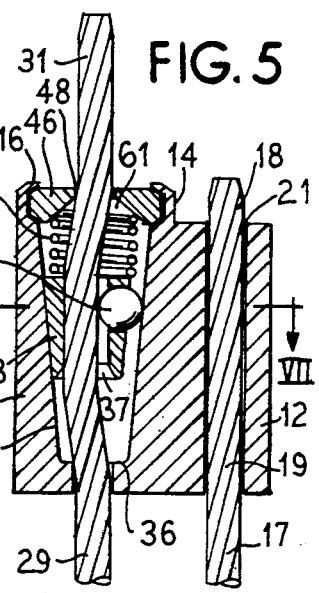
FIG. 5 is a sectional view illustrating the free end of the cable completely passing through the locking means.

In use, the end 31 of the cable is passed through the locking ring 26 or other structure which is to be locked and then the end 31 is inserted into the opening 32 as shown in FIG. 4 so that it passes through the opening 37 in the truncated conical-shape member 33 and engages the ball 38 as shown in FIG. 4 and moves the truncated conical-shape member 33 and the ball 38 upwardly relative to FIG. 4 and compresses the spring 42 to the position shown in FIG. 5 so that the cable end 31 can freely pass upwardly relative to FIGS. 4 and 5 through the body member 13 and out opening 48 as shown in FIG. 5. When the cable has been moved through the body member 13 for the desired distance, the cable is released by the operator and the spring 42 moves the truncated conical member 33 and ball 38 down the inclined surface 51 of the conical-shape opening 34 so that the ball 38 locks the cable from movement in the down direction relative to FIG. 5.

Figure 3:
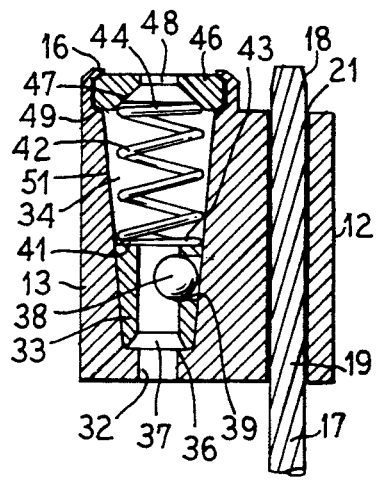
FIG. 3 is a sectional view taken on line III—III from FIG. 6.

If an attempt is made to pull the cable 29 downwardly relative to FIG. 5, this tends to move the conical-shape member 33 downwardly because the ball 38 rides on the conical surface 51 and since the opening 34 becomes smaller toward the bottom relative to FIGS. 3, 4 and 5 as the conical member 33 and ball 38 move downwardly relative to these FIGS. the ball presses harder against the cable, thus locking it so it cannot be pulled in the downwardly direction relative to FIGS. 3, 4 and 5. Thus, once the cable has been inserted into the body member 13, it cannot be removed from the body member.

Although the invention has been described with respect to preferred embodiments, it is not to be so limited as changes and modifications can be made therein which are within the full intended scope as defined by the appended claims.

I claim as my invention:

1. A cable lock and seal device comprising, a body member formed with first and second openings, a cable with a first end fixedly mounted in said first opening, said second opening comprising a tapered opening, a truncated cone-shaped member mounted in said second opening and formed with a central opening through which the second end of said cable can be inserted, a single transverse opening formed in said truncated cone-shaped member, a single ball mounted in said single transverse opening, and engageable with the side wall of said tapered second opening of said body member, and a coil spring biasing means engageable with said truncated cone-shaped member to bias it in a said direction relative to said body member such that said single ball engages said second end of said cable so as to lock it to said body member between said single ball and the surface of said truncated cone-shaped member within said central opening of said truncated cone-shaped member, wherein a washer formed with a tapered central opening is mounted to said body member over said second tapered opening and said coil spring biasing means is mounted between said washer and said truncated cone-shaped member, and wherein said first end of said cable is staked to said body member within said first opening.

* * * * *